(12) United States Patent
Azadeh

(10) Patent No.: US 8,886,033 B2
(45) Date of Patent: Nov. 11, 2014

(54) ENHANCED STATUS MONITORING, STORAGE AND REPORTING FOR OPTICAL TRANSCEIVERS

(75) Inventor: Mohammad Azadeh, Northridge, CA (US)

(73) Assignee: Source Photonics, Inc., Chatsworth, CA (US)

( * ) Notice: Subject to any disclaimer, the term of this patent is extended or adjusted under 35 U.S.C. 154(b) by 306 days.

(21) Appl. No.: 13/427,691

(22) Filed: Mar. 22, 2012

(65) Prior Publication Data
US 2013/0251361 A1  Sep. 26, 2013

(51) Int. Cl.
H04B 10/08 (2006.01)

(52) U.S. Cl.
USPC .............................. 398/22; 398/25; 398/38

(58) Field of Classification Search
CPC ........... H04B 10/0073; H04B 10/0775; H04B 10/0793; H04B 10/0795; H04B 10/07953; H04B 10/07955
USPC ................................ 398/22–27, 33, 35, 38
See application file for complete search history.

(56) References Cited

U.S. PATENT DOCUMENTS

| | | | |
|---|---|---|---|
| 6,952,531 B2 | 10/2005 | Aronson et al. | |
| 7,079,775 B2 | 7/2006 | Aronson et al. | |
| 7,200,336 B2 | 4/2007 | Yu et al. | |
| 7,650,077 B2 | 1/2010 | Yu et al. | |
| 2006/0075230 A1* | 4/2006 | Baird et al. | 713/168 |
| 2006/0215545 A1* | 9/2006 | Nelson | 370/216 |
| 2008/0187033 A1* | 8/2008 | Smith | 375/228 |
| 2008/0226288 A1* | 9/2008 | Miller | 398/9 |
| 2009/0070797 A1* | 3/2009 | Ramaswamy et al. | 725/10 |
| 2010/0098413 A1 | 4/2010 | Li et al. | |

OTHER PUBLICATIONS

Todd Rope; "Dynamic Memory Allocation in an Optical Transceiver"; U.S. Appl. No. 13/070,358, filed Mar. 23, 2013.
Todd Rope; "Operational Status Flag Generation in an Optical Transceiver"; U.S. Appl. No. 13/075,092, filed Mar. 23, 2011.
Todd Rope and Mark Heimbuch; "Operational Status Indicators in an Optical Transceiver Using Dynamic Thresholds"; U.S. App. No. 13/371,313, filed Feb. 10, 2012.
Todd Rope and Mark Heimbuch; "Operational State Information Generation in an Optical Transceiver"; U.S. Appl. No. 13/348,599, filed Jan. 11, 2012.

* cited by examiner

Primary Examiner — Dzung Tran
(74) Attorney, Agent, or Firm — Andrew D. Fortney; Central California IP Group, P.C.

(57) ABSTRACT

An optical transceiver and methods for using the same are disclosed. The optical transceiver and methods may be useful for providing more accurate information regarding trends in operation of the optical transceiver, predicting an impending failure of the optical transceiver, and providing details of the optical transceiver prior to failure. The optical transceiver generally includes (1) at least one of (i) a receiver configured to receive optical information and (ii) a transmitter configured to transmit optical information, (2) circuitry configured to sample data for one or more operational parameters of the receiver and/or transmitter, (3) logic configured to perform one or more statistical calculations on the sampled data to generate statistical information, and (iv) one or more memories configured to store the sampled data and the statistical information.

19 Claims, 5 Drawing Sheets

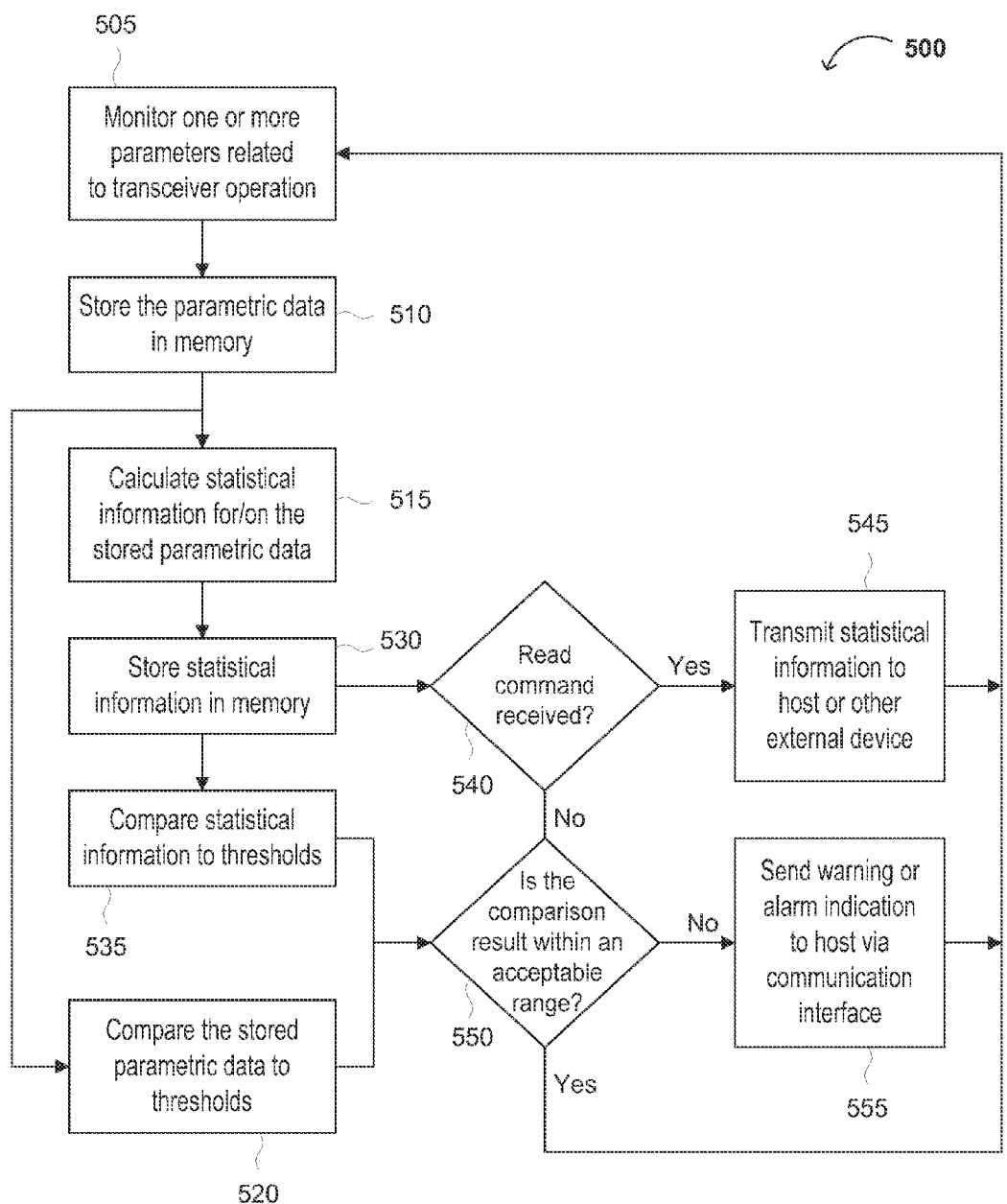

ENHANCED STATUS MONITORING, STORAGE AND REPORTING FOR OPTICAL TRANSCEIVERS

FIELD OF THE INVENTION

The present invention generally relates to the field of optical data communications and network technology. More specifically, embodiments of the present invention pertain to methods, algorithms, architectures, circuits, software, and/or systems for monitoring operational parameters in optical devices utilizing stored data and/or statistical analysis.

DISCUSSION OF THE BACKGROUND

Optical transceivers send and receive data in an optical form over an optical link, such as a fiber-optic link. An optical transmitter can include laser driver circuitry to drive a laser or diode, such as a light-emitting diode (LED), to create optical pulses on the fiber-optic link from received electronic signals. An optical receiver can include a photosensitive diode to receive optical signals, which are then converted into electronic signals. Thus, an optical transceiver converts (i) optical signals into analog and/or digital electronic signals, and (ii) electronic signals into optical signals.

In order to determine if the optical transceiver is functioning correctly, various operational parameters are monitored. Flags are then generated to demonstrate the status of the operational parameters. In conventional approaches, the flags indicate whether a monitored, real-time (e.g., current) parameter value is greater than or less than a predetermined threshold value. For example, a flag may indicate that a current temperature value is slightly greater than a predetermined temperature value (e.g., a high temperature warning threshold). In some embodiments, a flag may indicate that a current temperature value is significantly greater than a predetermined temperature value (e.g., a high temperature alarm threshold). Thus, conventional transceivers monitor certain parameters to generate a flag(s) that indicates when a current parameter value is higher or lower than a predetermined operating value.

Conventional optical transceivers may indicate or provide one or more flag(s) indicative of the current value of a monitored parameter with respect to a predetermined threshold value. However, conventional optical transceivers do not provide information regarding monitored parameters over time. That is, the generated flag(s) provide information regarding real time or current parameter values, and users may not be aware of trends in transceiver operation or performance over time (e.g., that may have a periodic dependence) that can indicate underlying issues.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention pertain to methods, algorithms, architectures, circuits, software, and/or systems for storing and/or evaluating data and statistical information in optical devices, and generating alarms and warnings relating to such statistical information.

One aspect of the present invention is directed to an optical transceiver, comprising (1) at least one of (i) a receiver configured to receive optical information and (ii) a transmitter configured to transmit optical information, (2) circuitry configured to sample data for one or more operational parameters of the receiver and/or transmitter, (3) logic configured to perform one or more statistical calculations on the sampled data to generate statistical information, and (4) one or more memories configured to store the sampled data and the statistical information. The operational parameters may comprise at least one member of the group consisting of a temperature, a voltage, a current, an optical power, an output power, a modulation amplitude, a frequency, an amplifier gain, a channel spacing, and a wavelength. Additionally, the statistical information may comprise a maximum value, a minimum value, an average value, and/or standard deviation of at least one of the one or more operational parameters over one or more predetermined periods of time.

An additional aspect of the present invention relates to a method for monitoring one or more parameters in an electronic device. The method generally comprises (1) monitoring one or more parameters related to operation of the electronic device over time to determine a plurality of parameter values, (2) storing the plurality of parameter values in one or more memories, (3) calculating statistical information on the plurality of parameter values, (4) comparing the statistical information to one or more corresponding thresholds stored in the memory(ies), and (5) generating a status indication or flag when the statistical information crosses one or more of the corresponding thresholds. In further embodiments, the method comprises overwriting at least one previously stored parameter value with a corresponding most recent or current parameter value, and/or previously stored statistical information with most recent or current statistical information. In even further embodiments, the method comprises updating one or more previously stored parameter values at a rate less than that of storing the current parameter values, and/or updating previously stored statistical information at a rate less than that of storing the most recent or current statistical information.

Embodiments of the present invention can advantageously provide an approach for monitoring an optical transceiver in real time, over a predetermined time interval, or over the entire operating life of the optical transceiver. A current value of a monitored operating parameter and an average operating parameter value (over a predefined time interval) can be stored and compared to predefined thresholds to determine whether components and/or circuitry in the optical transceiver are operating within an acceptable range. That is, the present invention can provide more accurate information regarding trends in optical transceiver operation, predict an impending transceiver failure, and be used as a type of "black box" to enhance failure analysis by providing details of the optical transceiver just prior to failure.

These and other advantages of the present invention will become readily apparent from the detailed description of various embodiments below.

BRIEF DESCRIPTION OF THE DRAWINGS

FIG. 5 is a flow diagram showing an exemplary method of generating statistical information and status indications in accordance with embodiments of the present invention.

DETAILED DESCRIPTION

Figure 1:
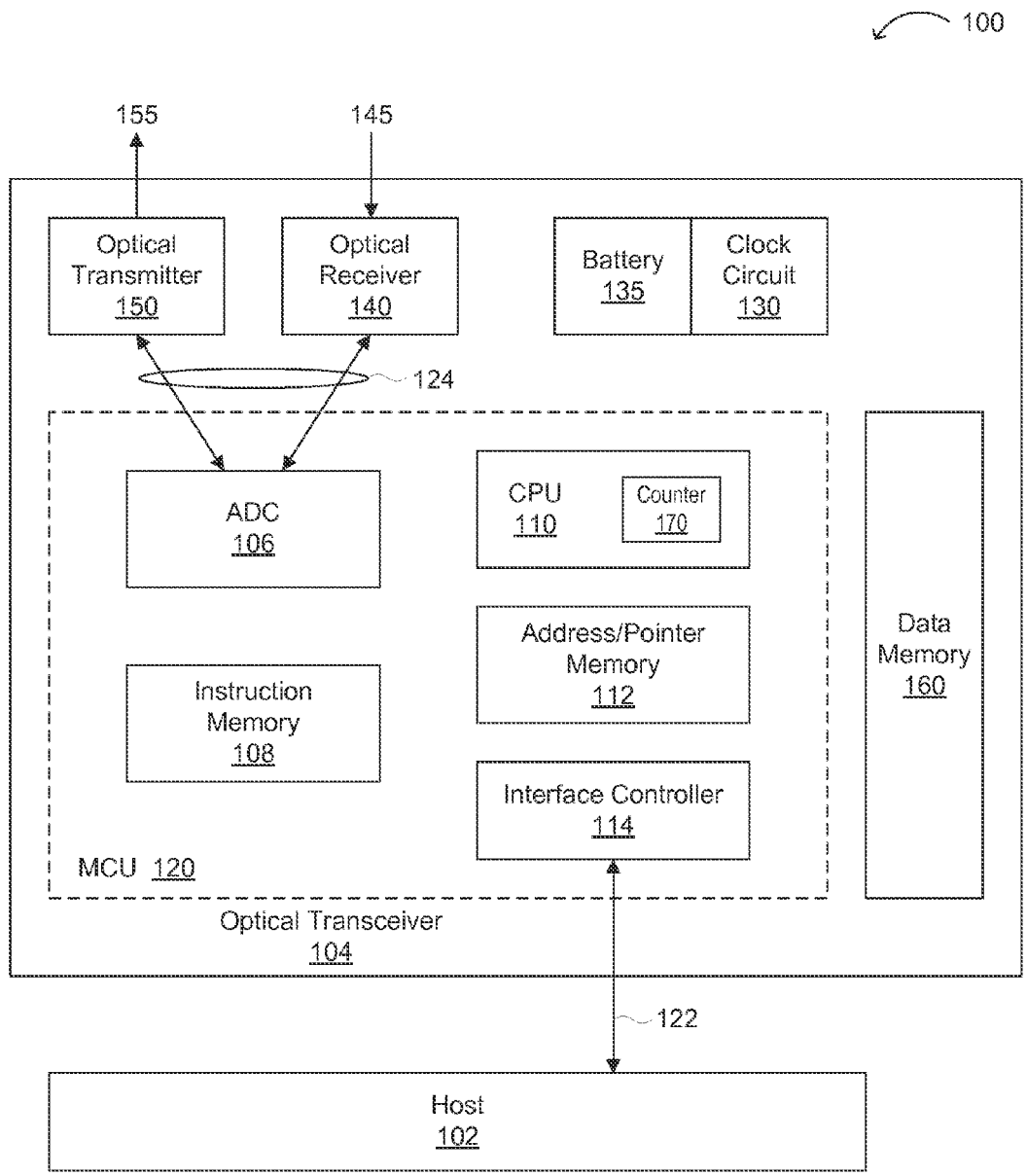
FIG. 1 is a block diagram showing an exemplary optical transceiver system in accordance with embodiments of the present invention.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on code, data bits, or data streams within a computer, processor, controller and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, streams, values, elements, symbols, characters, terms, numbers, or the like, and to their representations in computer programs or software as code (which may be object code, source code or binary code).

It should be borne in mind, however, that all of these and similar terms are associated with the appropriate physical quantities and/or signals, and are merely convenient labels applied to these quantities and/or signals. Unless specifically stated otherwise and/or as is apparent from the following discussions, it is appreciated that throughout the present application, discussions utilizing terms such as "operating," "calculating," "determining," or the like, refer to the action and processes of a computer or data processing system, or similar processing device (e.g., an electrical, optical, or quantum computing or processing device or circuit), that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data similarly represented as physical quantities within other components of the same or a different system or architecture.

Furthermore, in the context of this application, the terms "signal" and "bus" refer to any known structure, construction, arrangement, technique, method and/or process for physically transferring a signal from one point in a circuit to another. Also, unless indicated otherwise from the context of its use herein, the terms "designated," "fixed," "given," and "predetermined" generally refer to a value, quantity, parameter, constraint, condition, state, process, procedure, method, practice, or combination thereof that is, in theory, variable, but is typically set in advance and not varied thereafter when in use. Similarly, for convenience and simplicity, the terms "time," "rate," "period" and "frequency" are, in general, interchangeable and may be used interchangeably herein, but are generally given their art-recognized meanings Also, for convenience and simplicity, the terms "data," "bits," and "information" may be used interchangeably, as may the terms "coupled to," and "in communication with" (which may refer to direct or indirect connections, couplings, or communications), but these terms are generally given their art-recognized meanings herein.

The invention, in its various aspects, will be explained in greater detail below with regard to exemplary embodiments.

An Exemplary Optical Transceiver

An embodiment of the present invention relates to an optical transceiver comprising (1) at least one of (i) a receiver configured to receive optical information and (ii) a transmitter configured to transmit optical information, (2) circuitry configured to sample data for one or more operational parameters of the receiver and/or transmitter, (3) logic configured to perform one or more statistical calculations on the sampled data to generate statistical information, and (4) one or more memories configured to store the sampled data and the statistical information.

FIG. 1 illustrates an exemplary system 100 and optical transceiver 104 in accordance with embodiments of the present invention. Optical transceiver 104 (e.g., a fiber-optic transceiver) can be coupled to a host 102 or other external device. Host 102 can be a host processor, circuit board, stand-alone optical network device (e.g., repeater, optical switch, set-top box, etc.) or any other component or device including a suitable controller or processor. Host 102 can interface with optical transceiver 104 via communications interface 122. Communications interface 122 can be a serial interface, and is configured to provide bidirectional communications between host 102 and fiber-optic transceiver 104 (e.g., via interface controller 114). Alternatively, communications interface 122 can be a parallel interface carrying a multi-bit signal.

Optical transceiver 104 can include a microcontroller unit (MCU) 120, a clock circuit 130, a battery 135, an optical receiver 140, an optical transmitter 150, and data memory 160. For example, optical receiver 140 can be a photodiode or any other device configured to receive an optical signal 145 and convert the received optical signal into an electrical signal. Optical transmitter 150 can include a light-emitting diode (LED), laser diode, or any other suitable device for generating light pulses (e.g., optical signals) over an optical signal medium 155 (e.g., a fiber-optic link). Optical signals 155 and 145 may be transmitted over separate optical links, or may be part of a common fiber-optic link or any other suitable optical connection (e.g., optical waveguide, multi-mode fiber[s] [MMF], single-mode fiber[s] [SMF], etc.). In addition, an optical duplexer, an optical triplexer, or other multiple transceiver configurations can be formed by including two or more optical transmitters 150 and/or optical receivers 140 (e.g., two or more optoelectronic transmitters with a single optoelectronic receiver).

Analog electronic signals 124 are transmitted between analog-to-digital converter (ADC) 106 and optical transmitter 150, and between optical receiver 140 and ADC 106. Analog electronic signals 124 can accommodate optical signal information in an electronic form. ADC 106 can then convert these electronic signals from an analog form into a digital form to allow for digital processing within MCU 120. MCU 120 can further include interface controller 114, logic (e.g., a central processing unit [CPU] or microprocessor) 110, counter 170, and memory (e.g., instruction memory 108 and/or address and pointer memory 112). MCU 120 generally receives and transmits communications with host 102 over host communications interface 122. In alternative embodiments, ADC 106, instruction memory 108, and/or address and pointer memory 112 are separate units configured to electronically communicate with MCU 120 using separate individual interfaces.

Figure 2:
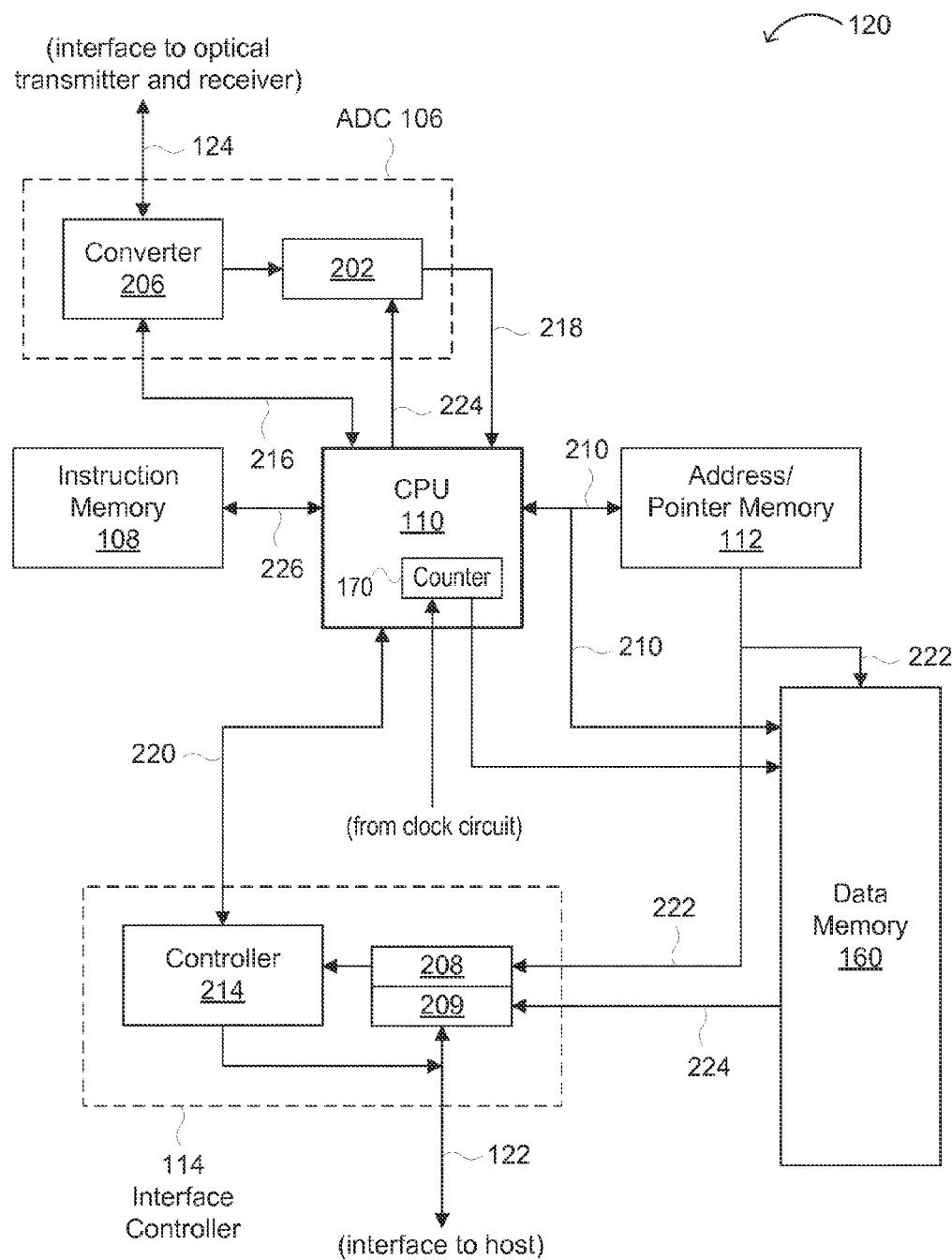
FIG. 2 is a block diagram showing exemplary hardware for an optical transceiver in accordance with embodiments of the present invention.

In certain embodiments, memory 108 includes non-volatile memory (e.g., instruction memory 108) and volatile memory (e.g., address and pointer memory 112 [see FIG. 2]). Generally, thresholds are stored in volatile memory. In some applications, instructions can be stored in the volatile memory (e.g., RAM) or other high-speed memory for performance reasons. Further, various data (e.g., configuration data and/or initial thresholds) can be stored in ROM or other non-volatile memory for efficiency reasons, such as when the stored data does not change or changes relatively infrequently. Examples of non-volatile memories include electrically erasable programmable read-only memory (EEPROM), flash EEPROM, magnetoresistive RAM (MRAM), laser programmable memories (e.g., fuse-based), or any other suitable type of ROM or non-volatile storage. Examples of volatile memories include static random-access memory (SRAM), dynamic RAM (DRAM), or any other suitable type of RAM or volatile storage element that maintains a stored state when power is applied and that can be rewritten without application of special voltages or use of special procedures (e.g., conventional non-volatile memory write and/or erase procedures).

Clock circuit 130 can provide a clock signal to optical transceiver 104 when the optical transceiver receives power form an external power source and is powered "ON," or continuously (e.g., without an external power source). In such an embodiment, clock circuit 130 is electrically connected to battery 135, which provides power when the external power source is not received (e.g., when the optical transceiver temporarily loses power as a result of a fault or power outage). Clock circuit 130 generally has a frequency of from about 10 kHz to 300 MHz (e.g., 32.7 kHz, 3.57 MHz, 4.43 MHz, 10 MHz, 14.3 MHz, or any value sufficient to enable functional and stable operation of counter 170). Counter 170 can receive the clock signal and count the number of cycles of the signal that results in a predetermined period of time (e.g., 1 second, 10 seconds, 1 minute, etc.) elapsing. Additionally, by utilizing battery 135, an external power source is not required, and the date of manufacture can be recorded (e.g., stored in data memory 160) and the working age of optical transceiver 104 can be continuously updated (e.g., utilizing clock circuit 130 in conjunction with data memory 160).

As discussed below in greater detail with respect to FIGS. 2 and 3, data memory 160 maintains parametric data, statistics information, thresholds, error checking code (optionally), percentage variance(s), percentage difference(s), operational statuses, and latched thresholds. A detailed description of the use of percentage variances and percentage differences in determining operational statuses may be found in U.S. patent application Ser. No. 13/371,313, filed Feb. 20, 2012, the relevant portions of which are incorporated by reference herein. The statistics information can be provided to host 102 via communications interface 122.

An Exemplary Microcontroller for an Optical Transceiver

FIG. 2 illustrates an exemplary microcontroller 120 for an optical transceiver (e.g., optical transceiver 104 in FIG. 1) in accordance with embodiments of the present invention. ADC 106 can interface with an optical transmitter and an optical receiver (e.g., optical receiver 140 and optical transmitter 150 in FIG. 1) via optical information signals 124. In some embodiments, ADC 106 is used to monitor a first operating parameter (e.g., parametric data related to operation(s) of optical transmitter 150 and/or optical receiver 140), and a second ADC (not shown) is used to monitor a second operating parameter different from the first operating parameter. In further embodiments, the present exemplary microcontroller 120 may comprise up to N ADCs configured to monitor N operating parameters, where N is any positive integer greater than zero (e.g., 2, 3, 5, 10, etc.). The different ADCs can operate at the same rate or at different rates. CPU 110 may utilize control signal 216 for interacting with ADC 106 via converter 206. Register 202 can contain an output for ADC 106 by capturing output data from converter 206. In some cases, a demultiplexer (not shown) or a bank of registers may be used in addition to, or in place of, register 202 in order to support a higher rate of data output from converter 206. For example, data can be output from converter 206 into a bank of registers in a sequential or round-robin fashion. In the example of a demultiplexer, data output from converter 206 may be sent via the various demultiplexer outputs to CPU 110 or to a register bank elsewhere in the optional transceiver.

For example, register 202 can include parametric data related to operation(s) of optical transmitter 116 and/or optical receiver 118 (see, e.g., FIG. 1). As discussed above, register 202, while shown in FIG. 2 as a single register, can also be implemented as a bank of registers, or an otherwise larger memory portion for capturing larger amounts of data from ADC 106. For example, various parametric data can be captured in a serial fashion or in parallel. As a result, although the output of converter 206 is generally multi-bit (e.g., n bits wide, where n is an integer of at least 2, such as 4, 6, 8, 10, 12, 16, 32, etc.), the data output by register 202 may be serial or parallel. In order for CPU 110 to retrieve this parametric data, data access control signal 224 can be activated by CPU 110. In response to control signal 224, data from register 202 can be output via ADC output signal/bus 218.

Parametric data (e.g., related to operation(s) of optical transmitter 116 and/or optical receiver 118) can be supplied to ADC output register 202 and/or accessed by CPU 110 (via ADC output signal/bus 218) at a predetermined frequency and/or on-demand. For example, converter 206 can periodically update register 202 during normal operation of ADC 106 and/or CPU 110. When data access control signal 224 is held in an active state, CPU 110 can receive the periodically updated data from register 202 via ADC output signal 218 at the same frequency that the parametric data is supplied to ADC output register 202 (e.g., from the optical transmitter 116 and/or optical receiver 118). For example, this parametric update rate can vary from about 1 ms to about 100 ms (e.g., about 50 ms), or at any other update rate within this range or outside this range, depending on the operating frequencies of ADC 106 and CPU 110 and the design of register 202 (e.g., whether it is or is part of a bank of registers, whether it includes a demultiplexer, etc.). Certain embodiments may also support a plurality of parametric data update rates (e.g., different update rates for different parameters), including variable update rates for one or more of the parameters for which data are periodically updated. For example, clock circuit 130 can provide a clock signal to CPU 110 such that CPU 110 updates the parametric data at predetermined intervals. Counter 170, on the other hand, maintains a count associated with the clock signal such that lengths of time associated with the predetermined intervals (e.g., a second, a minute, an hour, a day, a week, a month, etc.) can be determined.

In some applications, this parametric data update rate can be programmed by the manufacturer or a user. For example, the manufacturer can program data update rates appropriate for each parameter being monitored. For example, bias current and laser temperature may be updated relatively frequently (e.g., 1 update per 1-10 microseconds), but voltages or time may be updated relatively less frequently (e.g., 1 update per minute, hour, or day). Alternatively, a variety of supported update rates can be presented to the user for selection via a graphical user interface (GUI). Also, while a given parametric data update rate can be selected or otherwise fixed, parametric data can also be updated upon demand, such as in response to a request from host 102. In some cases, an option (e.g., a user-controlled option) can be employed whereby the parametric data is designated to be determined periodically or only updated upon demand. In other cases, on-demand parametric data updating can essentially act as an override or supplement to an otherwise periodic parametric data update mode. Thus, parametric data can be updated via register 202 and ADC output signal 218 periodically and/or upon demand, and these parametric data update modes may depend on particular applications, certain parameters, as well as manufacturer and/or user configurations.

CPU 110 can retrieve (e.g., fetch and/or pre-fetch) instructions from instruction memory 108 via interface signals 226. CPU 110 can also interface with address and pointer memory 112 via bus(es) 210. Address and pointer memory 112 can be a smaller and faster memory (e.g., have a smaller capacity/density and be configured to operate at a higher frequency) relative to the data memory 160. In one embodiment, address and pointer memory 112 comprises a cache memory, which can also store other information as desired. For example, address and pointer memory 112 may store copies of certain parametric data and associated thresholds that are most likely to be requested by CPU 110 for operational status determination. In this particular exemplary arrangement, address and pointer memory 112 can provide output signal 222 to interface controller 114. Parametric data received from ADC output 218 can be provided on bus(es) 210 to data memory 160 for storage. Additionally, address and pointer memory 112 can provide an address/pointer signal 222 to data memory 160, which then provides the requested data (i.e., at the address or location identified by the address/pointer signal 222) to interface controller 114 on bus 224. Data memory 160 can include a plurality of registers or other volatile memory that can be allocated for storage of parametric data, statistical information, target values, threshold values, error checking code, comparison results, etc. Further, data memory 160 can be subdivided into any number of blocks or other arrangements (e.g., different pages of memory or even different memory integrated circuits [ICs]).

In one embodiment, a user may store a predetermined number of parameters and/or thresholds in address and pointer memory 112 such that an associated operational status indication (e.g., an operational alarm or warning) or associated statistical information can be provided to host 102 in less processing time than methods not utilizing address and pointer memory 112. A "warning" status indication may indicate an operable system, but in which the system does not ensure or guarantee continued operability. An "alarm" status indication may represent a possible imminent shutdown of the system. Thus, the status indications may indicate that the system is at risk of faulty operation or shutdown due at least in part to the associated operational parametric data crossing the designated threshold in a predetermined direction. For example, the status indications may be represented by indicators such as or corresponding to "NORMAL," "OVER LIMIT," "UNDER LIMIT," "WARNING," "ALARM," and high and low variations of the warning and alarm indications (e.g., "LOW WARNING," "HIGH ALARM," etc.). Parametric data and associated thresholds and statistical information can be stored in address and pointer memory 112 based on factors such as elapsed writing time (e.g., parametric data, thresholds, and/or statistical information that are most recently written to or stored in data memory 160), or elapsed request time (e.g., parametric data, thresholds, and/or statistical information that was most recently requested by host 102). In this fashion, address and pointer memory 112 may effectively be used to decrease operational status indication and/or statistical information read time to service a request from host 102.

Each of buses 210 and 222 may independently be a serial bus or multi-bit bus, and bus 210 may support unidirectional or bidirectional signaling. Data memory 160 receives a counted clock signal from counter 170. The counted clock signal includes real-time clock information (e.g., seconds, minutes, hours, etc.). CPU 110 also receives a clock signal from clock circuit 130. Clock circuit 130 may be powered by battery 135 (e.g., when an external power source is not provided). CPU 110 can also send control signals on bus(es) 210 to control accesses to parametric data, thresholds, and optionally, error checking code (ECC) from data memory 160 in order to calculate and/or determine operational status indications and statistical information therefrom. Such accessing of parametric data and thresholds from data memory 160 may be performed periodically and/or in response to on-demand requests, such as requests from host 102 (e.g., to obtain an operational status and/or modify or set one or more thresholds). For example, data memory 160 can be accessed by CPU 110 and provide parametric data and thresholds at substantially the same rate that ADC output signal 218 is updated, or at a higher or lower rate.

A request for a status indication or status information (e.g., normal operating status, or an alarm or warning) and/or statistical information can be received by interface controller 114 via host communications interface 122. The operational status and/or statistical information request (e.g., from host 102) can include an identifier for the requested threshold and/or statistical information register. Register 208 can store the incoming threshold and/or statistical information register identifier, as well as associated outgoing threshold and/or statistical information. Alternatively, separate registers can be used to store incoming identifier information and outgoing threshold and/or statistical information. Controller 214 can send the request to CPU 110 using command signal(s) 220. CPU 110 may then correlate or map the identifier from the status indication and/or statistical information request to one or more particular memory locations in data memory 160, at which the corresponding parametric data, associated thresholds, and/or statistical information are located. For example, CPU 110 may maintain a table (e.g., address and pointer memory 112) that maps the threshold and/or statistical information register identifier(s) from the status indication and/or statistical information request(s) to the appropriate storage location(s) in data memory 160 (e.g., threshold registers 312 and statistics registers 116 in FIG. 3) so that CPU 110 can retrieve corresponding parametric data, thresholds, and/or statistical information for calculation of the requested status indication (see, e.g., U.S. patent application Ser. No. 13/070,358 filed Mar. 23, 2011, U.S. patent application Ser. No. 13/075,092, filed Mar. 29, 2011, U.S. patent application Ser. No. 13/348,599, filed Jan. 11, 2012, and U.S. patent application Ser. No. 13/371,313 filed Feb. 10, 2012, the relevant portions of which are included herein by reference). The table may comprise a bank of pointer registers (e.g., in address and pointer memory 112) that is accessed when the status indication and/or statistical information request(s) is received via command signal(s) 220.

Once CPU 110 receives the operational status and/or statistical information request(s) via command signal/bus(es) 220, CPU 110 can send a memory read request to data memory 160 via signal 210. Once the request, command, or a version or derivative thereof (e.g., an operational status and/or statistical information identifier) received on host communications interface 122 is sent to CPU 110 via command signal 220, CPU 110 can issue a read command via bus(es) 210 to data memory 160 and address and pointer memory 112. As part of this process, CPU 110 can effectively translate information received from host 102 as part of the operational status and/or statistical information request(s) into actual memory locations that store the parametric data, associated thresholds, and/or statistical information to be accessed in order to calculate the requested status indication and/or statistical information. The operational status and/or statistical information can then be sent from the data memory 160 via memory output signal 224 (or from address and pointer memory 112) via memory output signal 222. Alternatively, the operational status indication and/or statistical information may be sent from CPU 110 to interface controller 114. In any event, interface control register 208 can receive the operational status indication and/or statistical information, which may then be provided to host 102 via host communications interface 122. As discussed above, interface control register 208 may also be used to store the incoming status identification and/or statistical information. In this case, register 208 may be wide enough (e.g., 32 bits wide, 64 bits wide, 128 bits wide, etc.) to accommodate such incoming request information and outgoing status and/or statistical information. Alternatively, separate registers (e.g., registers 208 and 209, each having a width of 16 bits, 32 bits, 64 bits, etc.) can be used to store incoming information requests and outgoing status indication and/or statistical information data. Further, various registers and storage locations discussed herein may also be lumped together in the same memory block or other similar storage structure.

Acceptable threshold register sizes (e.g., 8 bits wide, 16 bits wide, 32 bits wide, etc.), depending on CPU architecture, operating system, as well as other design considerations (e.g., the number of bits of resolution of the parametric data), etc., can be determined for each particular embodiment utilized. In certain embodiments, acceptable statistical information register formats (e.g., bit maps, unsigned/signed integers, IEEE floating point, etc.) can also be supported. Furthermore, any suitable capacity (e.g., at least 2 kB, several kB, 16 kB, or higher) of data memory 160 can be supported in particular embodiments. Also, any suitable memory technologies or types of memories (e.g., flash memory, serial EEPROM, SRAM, DRAM, etc.) can be supported in particular embodiments. In addition, as discussed above, address and pointer memory 112 can represent a smaller and faster memory relative to data memory 160. Various registers and/or allocated memory portions can be found or replicated within address and pointer memory 112 to support faster accesses to parametric data, statistical information, thresholds, and/or status indications that may be stored therein.

Figure 3:
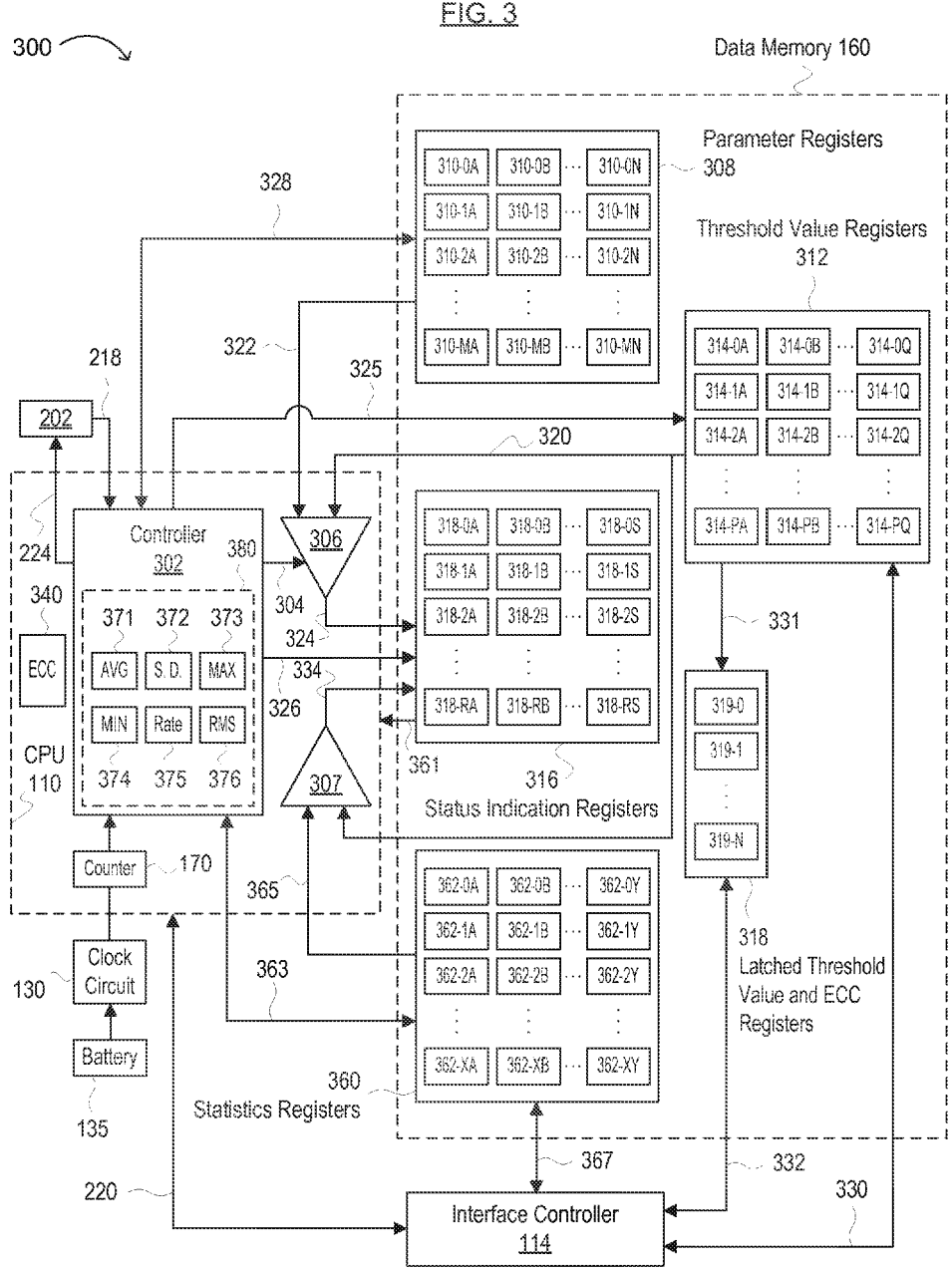
FIG. 3 is a block diagram showing an exemplary statistics generation and status indication control structure in accordance with embodiments of the present invention.

FIG. 3 illustrates an exemplary statistics generation and status indication control structure 300 in accordance with embodiments of the present disclosure. The present control structure 300 can be utilized to calculate and store statistical information on monitored parameter values, as well as generate status indications (e.g., alarms and warnings) based on the monitored parameter values and statistical information. In some embodiments, control structure 300 may calculate statistical information as a function of time (e.g., using a clock circuit and a counter). Control structure 300 can provide more accurate information regarding trends in optical transceiver operation, predict an impending transceiver failure, and be used as a type of "black box" to enhance failure analysis by providing details of the optical transceiver just prior to failure.

As shown, statistics generation and status indication control structure 300 may comprise a clock circuit 130, battery 135 (optional), CPU 110, ADC register 202 within ADC 106 (not shown), interface controller 114, and data memory 160. As discussed above, ADC output register 202 may be implemented as a bank of registers instead of one register, and operating parameter registers 308 may form this bank of registers as a replacement for, or in addition to, ADC output register 202. Data memory 160 comprises parameter registers 308, threshold value registers 312, status indication registers 316, latched threshold value and ECC registers 318, and statistics registers 360, each of which is discussed below in greater detail. Additionally, CPU 110 comprises error checking code (ECC) block 340, counter 170, comparators 306 and 307, and statistics generation and status indication controller 302, itself comprising statistics logic 380.

Statistics logic 380 may comprise a plurality of statistics determination and/or calculation blocks (e.g., an average value logic block 371, a standard deviation logic block 372, a maximum value logic block 373, a minimum value logic block 374, a data rate logic block or calculator 375, and a root mean square [RMS] value block 376) configured to perform statistical calculations or analysis on received parameter values. Average value logic block 371 is generally configured to determine an average value of a monitored parameter over a predetermined time interval or over a number (e.g., a predetermined number) of samples. Standard deviation logic block 372 is generally configured to determine a standard deviation of a parameter value monitored or sampled during a predetermined time interval or over a (predetermined) number of samples. Maximum value and minimum value logic blocks 373 and 374 are generally configured to determine a maximum value and a minimum value, respectively, of one or more operating parameters during a predetermined time interval or over a (predetermined) number of samples. Rate block or rate calculator 375 is generally configured to determine a rate (e.g., a rate of increase or decrease) of one or more of the monitored parameter values per unit time (e.g., per minute, per hour, per day, etc.). RMS value block is generally configured to determine a RMS value of one or more operating parameters during a predetermined time interval or over a (predetermined) number of samples. Additionally, buses and/or signals 320, 322, 324, 325, 326, 328, 334, 361, 363, and 365 shown in FIG. 3 may represent more detailed versions of the bus(es) 210 shown in FIG. 2.

In one embodiment, data memory 160 comprises parameter registers 308, which store values of the monitored parameter(s) received from ADC 106. Statistics generation and status indication controller 302 in CPU 110 can activate signal 224 to read the parametric data contents of ADC output register 202 on ADC output signal/bus 218. Statistics generation and status indication controller 302 can then write the accessed parametric data relating to optical transceiver operation into parameter registers 308 via bus 328. Parameter registers 308 may include a first block (or bank) of parameter registers 310-0A, 310-0B, 310-0C (not shown), . . . 310-0N, a second block of parameter registers 310-1A, 310-1B, 310-1C (not shown), . . . 310-1N, a third block of parameter registers 310-2A, 310-2B, 310-2C (not shown), . . . 310-1N, . . . and so on through an Mth block of parameter registers 310-MA, 310-MB, 310-MC (not shown), . . . 310-MN, where M+1 is a number of monitored operating parameters and N is a number of samples and/or time periods over which the M+1 operating parameters are monitored. M may be zero or any positive integer, and N may be any integer of at least two. For example, N may correspond to four predetermined time periods and/or samples (i.e., N=4), in which case the samples may be taken at 250 millisecond time periods; N may be equal to six, in which case the samples may be taken at 10 second time periods; N may be equal to ten, in which case the samples may be taken at 6 minute time periods; N may be equal to 24, in which case the samples may be taken at 1 hour time periods, etc.

In one embodiment, register 310-0A may be used to store a most recent parameter value for a first monitored parameter, register 310-0B may be used to store a second most recent parameter value for the first monitored parameter, register 310-0C may be used to store a third most recent parameter value for the first monitored parameter, etc. In some embodiments, controller 302 can identify and/or select one or more subgroups of registers in each group of registers (e.g., a first subgroup formed by registers 310-1A through 310-1D [not shown], and a second subgroup formed by registers 310-1E [not shown] through 310-1H [not shown], etc.), for storage of parametric data at different rates, as discussed below in greater detail.

Threshold value registers 312 are configured to store thresholds used to determine whether a particular operating parameter in parameter registers 308 or a statistical parameter value in statistics registers 360 crosses at least one corresponding threshold value (e.g., in a predetermined direction). The thresholds may be stored as numerical values or as percentages (e.g., as percentage differences between an initial or predetermined target value; see, e.g., U.S. patent application Ser. No. 13/371,313, filed Feb. 20, 2012, the relevant portions of which are incorporated by reference herein). As shown, threshold value registers 312 comprise a first block of threshold registers 314-0A, 314-0B, . . . 314-0Q, a second block of threshold registers 314-1A, 314-1B, . . . 314-1Q, a third block of threshold registers 314-2A, 314-2B, . . . 314-2Q, up to an Pth block of threshold registers 314-PA, 314-PB, . . . 314-PQ, where P+1 is the number of operating and/or statistical parameters for which status information is monitored or requested, and Q is the number of threshold values to be applied to the various parameters. P may be zero or any positive integer, and Q may be any positive integer.

For example, register 314-0A can be used to store a threshold value relating to a high warning status indication for a first operating parameter, register 314-0B can be used to store a threshold value relating to a high alarm status indication for the first operating parameter, etc. Such thresholds can include absolute thresholds for the parameter values, such as high and low thresholds (e.g., for an operating voltage or supply voltage), warning and alarm thresholds (e.g., for a laser temperature, optical receiver temperature, etc.), high and low warning and alarm thresholds, and statistics thresholds. The statistics thresholds may include one or more average value thresholds (e.g., high and low thresholds), one or more maximum value thresholds, and/or a minimum value thresholds (e.g., one or more warning and/or alarm thresholds for a parameter exceeding a maximum threshold or going below a minimum threshold), one or more RMS value thresholds, maximum and minimum rate thresholds, etc. More specifically, a threshold value register 314-2A may store a first average value threshold for a predetermined operating parameter, a threshold value register 314-2B may store a second average value threshold for the predetermined operating parameter, a threshold value register 314-2C may store a maximum value threshold for the predetermined operating parameter, a threshold value register 314-2D may store a minimum value threshold for the predetermined operating parameter, etc.

Furthermore, in alternate embodiments, the statistics thresholds may include threshold values for a particular statistical value (e.g., a statistical value calculated on a block or subgroup of the parametric data in parametric registers 308) over a predetermined period of time, such as a one second, one minute, one hour, one day, one week, etc. For example, threshold value register 314-2E may store an average value threshold for a particular operating parameter during a first predetermined time period (e.g., a one minute time period), threshold value register 314-2F may store an average value threshold for the operating parameter during a second predetermined time period (e.g., a one hour time period), threshold value register 314-2G may store an average value threshold for the operating parameter during a third predetermined time period (e.g., a one day time period), threshold value register 314-2H may store a minimum value threshold for the operating parameter during a fourth predetermined time period (e.g., a one week time period), etc.

The thresholds can be pre-programmed (e.g., using "default" values provided by a user via host 102 by way of interface controller 114 on bus 330), overwritten (e.g., by host 102), or automatically rewritten depending on a value of a second parameter (e.g., via controller 302 on bus 320). A description of changing thresholds based upon the status or value of a second parameter may be found in U.S. patent application Ser. No. 13/371,313, filed Feb. 10, 2012, the relevant portions of which are incorporated by reference herein.

At least one of the latched dynamic threshold value and ECC registers 317 (e.g., registers 319-0, 319-1, . . . 319-N) stores the same threshold(s) as that stored in a corresponding threshold value register 312, with ECC added thereto. For example, an ECC can be calculated on the threshold data (e.g., by ECC block 340 in CPU 110), appended to the threshold, and the combined threshold and ECC can be stored in threshold value register 312 (e.g., register 314-0A). Alternatively, ECC block 340 can perform an error checking calculation (e.g., a checksum, a parity determination, a cyclic redundancy check [CRC], etc.) on the threshold stored in register 312 to generate the error checking code, which is appended onto the threshold and then stored in threshold value and ECC registers 317. In some embodiments, a "memory lock" request can be provided to controller 302 (e.g., via interface controller 114 on bus 332) such that the contents stored in registers 317 is locked or latched. In response to the request, some or all of the thresholds and corresponding ECCs in threshold registers 312 are copied to and/or latched in latched threshold value and ECC registers 317 (e.g., by controller 302 via bus 331), and the threshold value registers 312 are then "locked" (i.e., not enabled for write operations). After the "memory lock" request is removed (e.g., by providing a "memory unlock" request to controller 302), the threshold value registers 312 may be overwritten with new threshold values. Thus, the ECC stored in registers 312 and/or registers 317 can be used to check or confirm that the corresponding threshold value is correct. A description of latched dynamic threshold value and ECC registers 317 may be found in U.S. patent application Ser. No. 13/371,313, filed Feb. 10, 2012, the relevant portions of which are incorporated by reference herein.

Status indication registers 316 comprise a first block of status indication registers 318-0A, 318-0B, . . . 318-0S, a second block of status indication registers 318-1A, 318-1B, . . . 318-1S, a third block of status indication registers 318-2A, 318-2B, . . . 318-2S, . . . up to an Rth block of status indication registers 318-RA, 318-RB, . . . 318-RS, where R+1 is the number of monitored operating and/or statistical parameters for which status information is monitored or requested, and S is a number of states and/or flags to be stored for the R+1 operating parameters. R may be zero or any positive integer, and S can be any positive integer. Status indication registers 316 can be configured to store a result of a comparison (e.g., of a parameter value in parameter registers 308 with corresponding thresholds in threshold registers 312 by comparator 306 received on bus 324) or a statistical value in statistics registers 360 with a corresponding threshold in threshold registers 324 received on bus 334.

For example, a first status indication register 318-0A may store a result of a comparison between (i) a parameter value stored in parameter register 310-0A and (ii) a corresponding set of thresholds stored in threshold registers 314-0A through 314-0Q (or a subset thereof, such as registers 314-0A through 314-0D). Similarly, a second status indication register 318-0B may store a result of a comparison between (i) a parameter value stored in parameter register 310-0B and (ii) a corresponding set of thresholds stored in threshold registers 314-0A through 314-0Q (or subset thereof). Alternatively, status indication register 318-0B can store a result of a different comparison between parameter register 310-0A and a different subset of thresholds (e.g., threshold values stored in threshold registers 310-0E and 310-0F). Similarly, a status indication register storing status indications for a statistical parameter (e.g., an average temperature) may store a result of a comparison between (i) an average temperature value stored in one of statistics registers 360, and (ii) a corresponding subset of threshold values stored in a subset of threshold registers (e.g., registers 318-PA though 318-PQ).

More specifically, to determine a status indication, statistics generation and status indication controller 302 can instruct data memory 160 to output parametric data from one of the parameter registers 308 on bus 322 and corresponding thresholds from threshold registers 312 on bus 320, automatically or based on a (register) identifier (e.g., from address and pointer memory 112 or a status request received through interface controller 114). Comparator 306 may receive an enable signal (e.g., via bus 304) and compare the parametric data against the corresponding thresholds (e.g., one at a time or in parallel, using parallel comparators) to determine a status indication (e.g., a state or a series of flags) at comparator output 324 that indicates the relative magnitude of the parametric data versus the thresholds. Comparator 306 (and comparator 307, discussed below) may comprise a digital comparator, a magnitude comparator, or a plurality of such comparators that receives two or more numbers (e.g., parametric data for the operating parameter value and one or more corresponding threshold values) as inputs in binary form (e.g., bit strings) and determines whether the parametric value is greater than, less than, or equal to the threshold value(s). Thus, comparator 306 may compare a percentage variance (e.g., from a target parameter value) to a percentage difference (e.g., representing a particular threshold; see, e.g., U.S. patent application Ser. No. 13/371,313, filed Feb. 10, 2012, the relevant portions of which are incorporated by reference herein). A result of the comparison can be used to generate an alarm or warning status indication. In some embodiments, data stored in status indication registers 316 can be provided to controller 302 (e.g., via bus 361), and a counter in controller 302 (not shown) can count the number of alarms and warnings generated during a predetermined time interval.

Statistics registers 360 include a first block of registers 362-0A, 362-0B, . . . 362-0Y, a second block of registers 362-1A, 362-1B, . . . 362-1Y, a third block of registers 362-2A, 362-2B, . . . 362-2Y, . . . and an Xth block of registers 362-XA, 362-XB, . . . 362-XY, where X+1 is a number of monitored operating and/or statistical parameters for which statistical information is desired or requested, and Y is a number of statistical operations and/or time periods over which each of the parameters are monitored. X can be zero or any positive integer (e.g., three or more), and Y can be any positive integer greater than or equal to two (e.g., greater than or equal to four, six, eight, or more). Statistics registers 360 receive statistical information (e.g., outputs of statistical calculations) from statistics logic 380 on bus 363. The statistical information may include a maximum value, one or more rates, a minimum value, one or more average values, a root mean square (RMS) value, and/or one or more standard deviations of an operating parameter.

For example, statistics register 362-0A may store an average value of a first group of parameter registers (e.g., registers 318-0A though 318-0N), statistics register 362-0B may store a maximum value of the first group of parameter registers, statistics register 362-0C may store a minimum value of the first group of parameter registers, statistics register 362-0D may store a standard deviation of the first group of parameter registers, etc. Similarly, if a time period for taking samples corresponding to the first group of parameter registers 318-0A though 318-0N is known, a rate of change in the value of the first parameter can be stored in statistics register 362-0E, for example.

Additionally, when new parametric data is obtained for a given subgroup of parameter registers, average value block 371 can determine an average value of the parametric data, and statistical information representing the given subgroup of parametric data stored in statistics register 360 can be updated (e.g., the statistical data, such as an average value, minimum value, maximum value, etc., can be overwritten with more recent data) and memory resources can be conserved. For example, a first average parameter value of the first group of parameter registers (e.g., parameter registers 318-0A though 318-0N) can be stored in a register in the first statistics block (e.g., statistics register 362-1A). When all of the parameter values stored in the first group of parameter registers are updated or overwritten, a second average parameter value of the first group of parameter registers can be stored in statistics register 362-1B. Similarly, when all of the parameter values stored in the first group of parameter registers are updated or overwritten a second time, a third average parameter value can be stored in statistics register 362-1C. When the parameter values are again updated or overwritten, a fourth average parameter value can be stored in statistics register 362-1D. If a time period for the first through fourth average values is known, then a fifth average (e.g., an average value of the four average parameter values) can be stored in, e.g., statistics register 362-1E, or in a new statistics block (e.g., any one of statistics registers 362-2A through 362-XA).

Stated differently, a first statistics register may store parameter values (e.g., average, maximum, minimum, RMS, etc.) over the most recent 10 second time period, a second statistics register may store parameter values over the most recent 10 minute time period, a third statistics register may store parameter values over the most recent 1 hour time period, etc. Stated differently, the various statistics registers can store most recent statistical parameter values at a rate or resolution that is greater than that of older or less recent statistical parameter values. For example, most recent maximum parameter values can be stored and/or updated periodically at a relatively high rate (e.g., 0.1, 1, or 5 second time intervals) to provide greater detail or resolution on the most recent maximum parameter values, whereas the same parameter values that are older or less recent may be stored and/or updated periodically at a relatively high rate (e.g., 1 minute, 1 hour, or 1 day time intervals).

Statistical information may be determined and stored according to the following exemplary embodiment. Controller 302 can provide the parametric data stored in parameter registers 308 to statistics logic 380, which can then calculate or compute statistical information on the retrieved parameter values. For example, using conventional average value calculation circuitry, average value logic block 371 can calculate an average value of a first subgroup of parameter registers (e.g., registers 310-0A through 310-0F) of a first monitored parameter, and provide a result of the calculation to statistics register 362-0A. The first subgroup of parameter registers 310-0A through 310-0F may represent a time period of one minute, one hour, one day, etc. Additionally, average value logic block 371 can calculate an average value of a second subgroup of parameter registers (e.g., registers 310-0G through 310-0L) of the first monitored parameter, and provide a result of the calculation to statistics register 362-0B. The second subgroup of parameter registers may represent the same or different time period as the first predetermined time period. Average value logic block 371 may also calculate an average value of all of the parameter registers (e.g., registers 310-0A through 310-0N) of the first monitored parameter, and provide a result of the calculation to a statistics register (e.g., register 362-0F).

Statistics logic blocks 372-376 can determine statistical information in a fashion similar to that described above with respect to average value logic block 371. For example, using conventional standard deviation calculation circuitry, standard deviation logic block 372 can calculate a standard deviation of the first subgroup of parameter registers and provide a result of the calculation to statistics registers 360 (e.g., statistics register 362-0G), maximum value logic block 373 can determine a maximum value of the first subgroup of parameter registers and provide a result of the determination to statistics register 362-0H, minimum value logic block 374 can determine a minimum value of the first subgroup of parameter registers and provide a result of the determination to statistics register 362-0I, and rate logic block 374 can calculate a rate (e.g., a change of value over time) of the first subgroup of parameter registers and provide a result of the calculation to statistics register 362-0J. Thus, each of the statistics logic blocks 372-376 calculates or determines statistical information on parametric data and provides a result of the calculation and/or determination to statistics registers 360.

Once the statistical thresholds and statistical information have been provided to data memory 160, the statistical thresholds and statistical information can be provided to comparator 307 (e.g., via buses 320 and 365). Comparator 307 can be used to compare statistical information stored in any of the statistics registers 360 to corresponding statistical thresholds stored in threshold value registers 312. More specifically, statistics generation and status indication controller 302 can instruct data memory 160 to provide threshold values from registers 312 (e.g., via bus 320) and corresponding statistics from registers 360 (e.g., via bus 365) to comparator 307. The instruction can be performed automatically or based on a (register) identifier (e.g., from address and pointer memory 112 or a status request). For example, data stored in statistics register 362-0A (e.g., an average value of the first subgroup of parameters) and data stored in threshold value registers 314-0A and 314-0B (e.g., corresponding high and low average value thresholds) can be provided to comparator 307. Comparator 307 can then compare the received data and provide a result of the comparison (e.g., a status indication) to status indication registers 316. The "average value" status indication may be represented by indicators such as or corresponding to "NORMAL," "HIGH," or "LOW." Thus, if comparator 307 determines that the average value of the first subgroup of parameters is greater than the high average value threshold for the first subgroup, a "HIGH" status indication may be generated and stored in status indication registers 316 (e.g., status indication register 318-2A).

Similarly, comparator 307 can be used to compare statistical information stored in any of the statistics registers 360 to corresponding statistical thresholds stored in threshold value registers 312. For example, statistical information stored in statistics register 362-4D (e.g., a maximum value of a fifth operating parameter) can be compared to a corresponding threshold value in threshold value register 314-4D. The comparison result (e.g., on bus 334; e.g., a "HIGH" or "LOW" status indicator) may be stored in one of status indication registers 316. In another example, statistical information stored in statistics register 362-4G (e.g., a rate of the fifth operating parameter) can be compared to corresponding threshold values in threshold value registers 314-4G through 314-4H. Thus, status indications may also be represented by indicators such as or corresponding to "NORMAL," "HIGH," "LOW," "WARNING," "ALARM," and high and low variations of the warning and alarm indications (e.g., "LOW WARNING," "HIGH ALARM," etc.). Alternatively, the indication may be a flag or a state (see, e.g., U.S. patent application Ser. No. 13/348,599, filed Jan. 11, 2012, the relevant portions of which are incorporated by reference herein). Once the status indications and statistical information have been determined and stored in data memory 160, the status indications and statistical information can be provided to an external device (e.g., a host) and/or the network (e.g., via interface controller 114). The status indications and statistics information can be provided automatically, or by a request from a host or other external device.

Thus, the present optical transceiver can be viewed as including a type of "black box," in which a variety of statistical information on one or more operating parameter(s) is calculated and stored prior to failure of the transceiver. Such statistical information can be used to improve failure analysis by providing operational details of the optical transceiver just prior to failure. The present transceiver can also provide more accurate information regarding trends in transceiver operation, and possibly predict an impending transceiver failure.

An Exemplary Optical and/or Optoelectronic Transceiver

Figure 4:
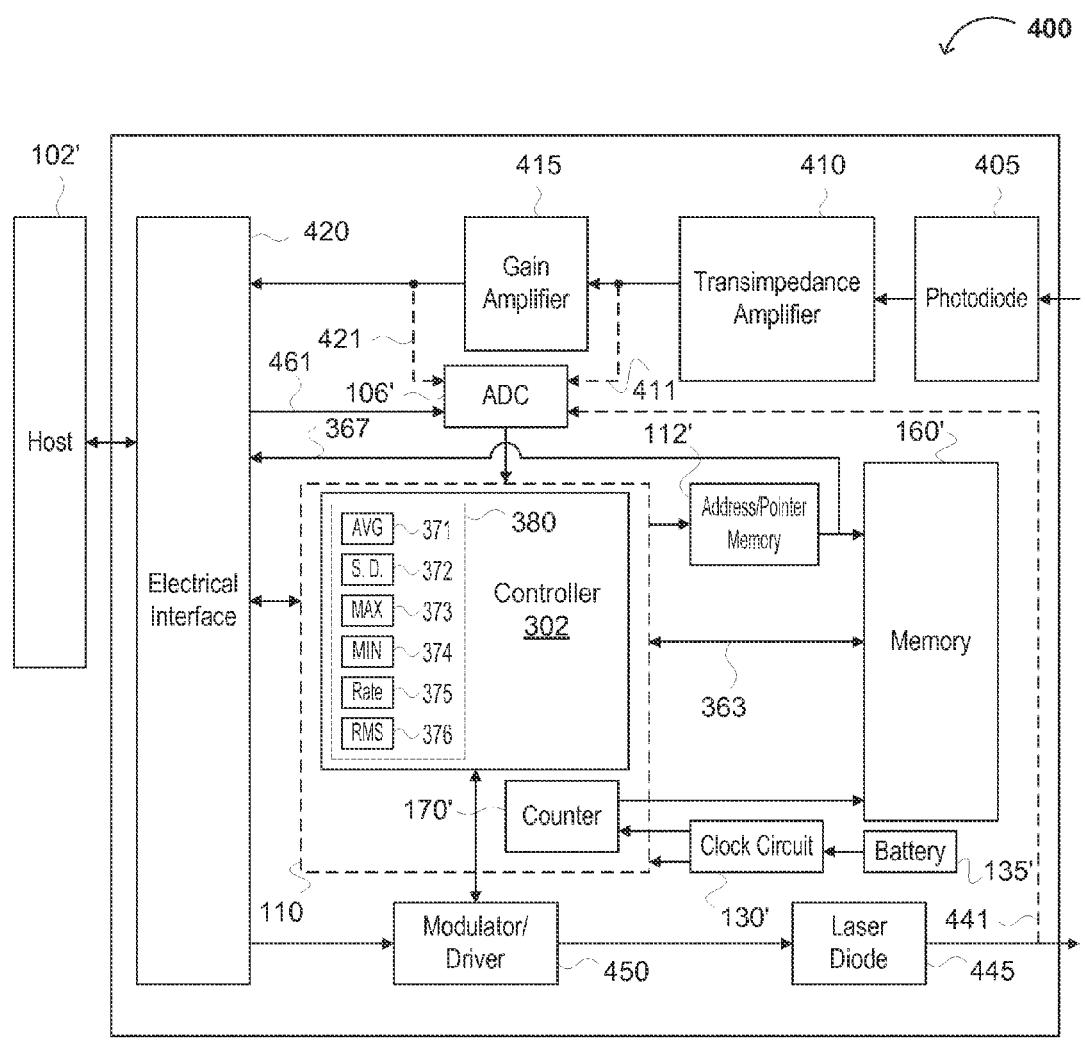
FIG. 4 is a diagram showing an exemplary optical and/or optoelectronic transceiver according to the present invention.

FIG. 4 shows an exemplary optical and/or optoelectronic transceiver 400 according to the present invention. Optical and/or optoelectronic transceiver 400 is configured to monitor at least one operating parameter related to transceiver operation, track statistical information and provide status indication(s) regarding the same. As shown, optical transceiver 400 comprises photodiode 405, transimpedance amplifier (TIA) 410, gain amplifier 415, electrical interface 420, CPU 110, ADC 106', address and pointer memory 112', data memory 160', clock circuit 130', battery 135', modulator and/or driver 450, and laser diode 445. Photodiode 405 can be any device configured to receive an optical signal (e.g., over an optical fiber from an optical transmitter such as optical transmitter 150 in FIG. 1) and provide an electrical signal. For example, photodiode 405 can be an avalanche photodiode (APD) or a p-type/intrinsic/n-type (PIN) photodiode. TIA 410 is configured to convert a current received by photodiode 405 into a corresponding voltage. Gain amplifier 415 is configured to amplify a voltage received by TIA 410. In some embodiments, gain amplifier 415 is a buffer. In other embodiments, gain amplifier 415 is a variable gain amplifier.

Electrical interface 420 can be any interface capable of accurately transferring data and/or signals between external host 102' and components of the optical transceiver 400 (e.g., statistics generation and status indication controller 302, modulator and/or driver 450, etc.). ADC 106' can be the same as or similar to ADC 106 discussed above with respect to FIGS. 1-3. As shown, CPU 110 comprises counter 170 and statistics logic 380, as discussed above with respect to FIG. 3. That is, CPU 110 comprises average value logic block 371, standard deviation value logic block 372, maximum value logic block 373, minimum value logic block 374, rate logic block 375, and RMS value logic block 376. External host 102' can be the same as or similar to host 102 discussed above with respect to FIG. 1 (e.g., a host processor, circuit board, stand-alone optical network device, etc.). Modulator and/or driver 450 is generally configured to adjust and/or provide a driving current provided to laser diode 345. Laser diode 445 (which may be included in a transmitter optical subassembly [TOSA], not shown) may comprise a directly modulated laser (DML), an electro-absorption modulated laser (EML), a distributed feedback laser diode (DFB-LD), or other laser configured to generate and/or transmit an optical signal over an optical fiber in an optical and/or optoelectronic network. Memory 160' may be the same as or similar to data memory 160 discussed above with respect to FIGS. 1-3, and be configured to store data (e.g., statistical information, threshold values, parameter values, etc.) received from CPU 110 (or for use by CPU 110), and addresses received from address and pointer memory 112'. Address and pointer memory 112' may be similar to address and pointer memory 112 discussed above with respect to FIG. 2. Similarly, clock circuit 130' and battery 135' may the same or similar to those discussed above with respect to FIGS. 1-3.

In general, an electrical data signal is received from an external device (e.g., host 102'), and provided to optical transceiver 400 via electrical interface 420. Once the data signal is received, modulator/driver 450 transmits an electrical signal and/or current to laser diode 445. In addition, an optical data signal is received at photodiode 210. The received optical data signal is converted by photodiode 210 to an electrical signal (e.g., a current), which is then provided to TIA 410. TIA 410 receives the electrical signal and provides a signal (e.g., a voltage) 411 to gain amplifier 415. Gain amplifier 415 provides an amplified signal 421 to electrical interface 420. In some embodiments, operational data related to the signals 411 and/or 421 are also provided to CPU 110 via ADC 106.

As discussed above, optical and/or optoelectronic transceiver 400 is configured to monitor at least one operating parameter related to transceiver operation. The operating parameter(s) may include a temperature, a voltage, a current, an optical power, an output power, a modulation amplitude, a frequency, an amplifier gain, a channel spacing, a wavelength, etc. For example, the operating parameter may include an output power provided to ADC 106' (e.g., an output power of laser diode 445 via signal 441). Additionally or alternatively, the operating parameter may include a voltage (e.g., of an output signal 411 of TIA 410), a current (e.g., from modulator/driver 450), a gain (e.g., provided by gain amplifier 415 at signal 421), and/or a temperature (e.g., of laser diode 445). In most embodiments, the monitored operating parameters are provided to ADC 106', which is configured to sample various measured parameter values and provide the sampled parameter values to CPU 110 for subsequent processing.

Once the operating parameter(s) are sampled by ADC 106', CPU 110 can determine and/or obtain statistical information and status indication(s) on the sampled parameter values, as described herein. Once the statistical information is obtained and/or determined, the statistical information (as well as the sampled parameter values) can be provided to data memory 160' (e.g., via bus 363). For example, the data output from controller 302 may include a comparison result and/or statistical information, such as one or more average values (e.g., provided by average value logic block 371), one or more standard deviations (e.g., provided by standard deviation logic block 372), one or more maximum values (e.g., provided by maximum value logic block 373), one or more minimum values (e.g., provided by minimum value logic block 374), one or more rates (e.g., provided by rate block 375), and/or one or more RMS values (e.g., provided by RMS block 376). In some embodiments, an output from CPU 110 (e.g., provided by controller 302) can be provided to data memory 160' via bus 363. In any embodiment, data output from controller 302 is provided to corresponding registers (not shown) in data memory 160' and/or address and pointer memory 112', when address and pointer memory 112' comprises a cache memory.

For example, as discussed above, an output power of laser diode 445 can be sampled by ADC 106 via bus(es) 441, and output power value data can be provided to CPU 110. The output power value data can then be provided to, for example, a parameter register in data memory 160' (e.g., as discussed above with respect to FIG. 3). CPU 110 can compare the output power value data to corresponding thresholds stored in data memory 160' and determine a status indication. Once calculated, the status indication can be stored in a status indication register. Additionally, the output power value data (e.g., stored in a parameter register in data memory 160') can be provided to statistics logic 380 so that statistical information can be calculated thereon. Once calculated, the statistical information on the output parameter power values can be stored in data memory 160' (e.g., in one or more statistics registers). When a request for statistical information and/or a status indication is received from host 102 via electrical interface 420, data stored in address and pointer memory 112 or data memory 160 can be provided to electrical interface 420 via bus 367 and subsequently provided to host 102. Similar techniques and/or methods can be utilized to determine status indications and calculate statistical information on other parameter values.

Thus, the present optical transceiver can be used to generate and/or calculate and store statistical information and status indications regarding parameters related to transceiver operations. The information can be provided to a user via a digital diagnostic monitoring interface (DDMI). The present optical transceiver can be viewed as including a type of "black box," in which a variety of statistical information on one or more operating parameter(s) is obtained and/or determined and stored during operation (and prior to failure) of the transceiver. Such statistical information can be used to improve failure analysis by providing operational details of the optical transceiver just prior to failure. The present transceiver can also provide more accurate information regarding trends in transceiver operation, and possibly predict an impending transceiver failure.

An Exemplary Method of Generating Statistical Information and Status Indications in an Electronic Device A further aspect of the present invention relates to a method for monitoring one or more operating parameters in an electronic device. The method comprises (i) monitoring one or more operating parameters related to operation of the electronic device (optionally over time) to determine a plurality of parameter values, (ii) storing the plurality of parameter values in one or more memories, (iii) calculating statistical information on the plurality of parameter values, (iv) comparing the statistical information to one or more corresponding thresholds, and (v) generating a status indication or flag when the statistical information crosses one or more of the corresponding thresholds. The present method can advantageously provide an approach for monitoring an electronic device over time, and ultimately, over an entire operating lifetime of the electronic device. By utilizing the present method, a variety of statistical information on one or more operating parameter(s) can be obtained and/or determined and stored prior to failure of the electronic device, and analyzed before or after failure of the device.

As shown in FIG. 5, flow chart 500 illustrates an exemplary method of monitoring parametric data, generating statistical information, and/or generating status indications for an optical and/or optoelectronic device. The method typically involves continuous processing through various loops in the flow, although it also encompasses a single pass through part or all of the flow. For example, in the method 500 and upon stable application of power (e.g., from an external power source), the optical transceiver may continuously send and/or receive optical transmissions (e.g., to and from an optical network), and continuously and/or periodically process parametric data and/or statistical information relating to the parametric data.

The method begins at 505, where one or more optical parameters related to optical transceiver operation are monitored. For example, referring to FIG. 2, monitoring the optical parameters may include CPU 110 enabling the sampling of parametric data by ADC 106 (e.g., via an enable signal such as signal 216). In some embodiments, the parametric data is sampled at 250 millisecond time intervals, 10 second time intervals, 6 minute time intervals, and/or 1 hour time intervals. As discussed above with respect to FIGS. 3 and 4, the operating parameter(s) may comprise a temperature, a voltage, a current, an optical power, an output power, a modulation amplitude, a frequency, an amplifier gain, a channel spacing, and/or a wavelength.

At 510, the parametric data are stored in memory. For example, and referring to FIG. 2, the parametric data can be transferred from ADC 106 to a suitable location (e.g., a location determined or allocated by CPU 110) in data memory 160 (e.g., parameter registers 308 in FIG. 3). Thus, in some embodiments, the parametric data is stored in designated parametric value registers. Additionally, in some embodiments, parameter values can be obtained at predetermined time intervals and stored in predetermined and/or designated parameter registers. Additionally, values for different operating parameters can be stored in different register groups, and values for the same operating parameter, but taken at different time intervals, can be stored in different register subgroups.

At 520, the parametric data stored in memory are compared to thresholds. In some embodiments, the thresholds are predefined and stored in memory (e.g., in threshold value registers 312 in FIG. 3). For example, the memory may comprise dynamically allocated memory (see, e.g., U.S. patent application Ser. No. 13/070,358 filed Mar. 23, 2011, the relevant portions of which are included herein by reference). Additionally, in some embodiments, the thresholds may be stored as bit-reduced threshold values, which can be used as different mathematical representations or manifestations of the stored thresholds (see, e.g., U.S. patent application Ser. No. 13/075,092, filed Mar. 29, 2011, the relevant portions of which are included herein by reference). The thresholds can include (i) a high threshold and a low threshold (e.g., for an operating voltage or supply voltage), (ii) a warning threshold and an alarm threshold (e.g., for a laser temperature, optical receiver temperature, etc.), and/or (iii) a low warning threshold, a low alarm threshold, a high warning threshold, and a high alarm threshold, in which a result of the comparison can be stored as a state (see, e.g., U.S. patent application Ser. No. 13/348,599, filed Jan. 11, 2012, the relevant portions of which are included herein by reference). As discussed above, the thresholds may be stored as percentage variances (e.g., when the monitored parameter value is stored as a percentage variance from a target operating condition/parameter value) or numerical values (see, e.g., U.S. patent application Ser. No. 13/371,313 filed Feb. 10, 2012, the relevant portions of which are included herein by reference).

At 515, statistical information on the stored parametric data 308 is determined and/or obtained. For example, as discussed above, the statistical information may include a maximum value, a minimum value, one or more average values, one or more rates, one or more standard deviations, and/or a RMS value of the monitored parameter(s). The statistical information may be calculated and/or determined using a controller, such as statistics generation and status indication controller 302 in FIG. 3. Additionally, statistical information (e.g., an average value, maximum value, RMS value, etc.) on a variety of subgroups of parameter registers (e.g., registers 310-0A through 310-0F in FIG. 3) can be obtained. Various subgroups of parameter registers may represent samples taken over a predetermined time period, such as a one minute, one hour, one day, one week, etc. At 530, the statistical information is stored in one or more memories. For example, referring to FIG. 3, the statistical information may be stored in statistics registers 360 in data memory 160'. For example, an average laser diode temperature for the first time period may be stored in a statistics register, a RMS value for a second operating parameter (e.g., a bias current) may be stored in a second statistics register, etc. Alternatively, a third statistics register may store the minimum value of a first group of parameter registers (e.g., registers 318-0A though 318-0N), a fourth statistics register may store the maximum value of the first group of parameter registers, etc.

At 535, the statistical information is compared to thresholds stored in memory. The thresholds (e.g., statistics thresholds) may be predefined and stored in memory (e.g., in threshold value registers 312 in FIG. 3). The thresholds may include average value thresholds (e.g., high and low thresholds), one or more maximum value thresholds (e.g., an upper limit to the value of a given operating parameter), one or more minimum value thresholds (e.g., one or more warning and/or alarm thresholds for a parameter going below a minimum threshold), one or more RMS value thresholds, maximum and minimum rate thresholds, etc.

At 540, the method determines whether the optical transceiver has received a read command or request. The read command or request may be received from a host (e.g., host 102 in FIG. 4) or other external device (e.g., via interface controller 114 in FIG. 3). The read command or request may be a request for statistical information, thresholds (e.g., statistical thresholds), one or more current parameter values, one or more status indications regarding the monitored operating parameter values stored in memory, etc. If a read command is received, then the method proceeds to 545, and the optical transceiver provides the statistical information and/or other data related to transceiver operation to the device requesting the statistical information and/or data. After the requested information has been provided to the host or other external device, the method returns to 505, and continues monitoring the operating parameter(s) related to transceiver operation.

If a read command is not received at 540, then the method determines if the result of the comparison between the statistical information and thresholds is within an acceptable range (e.g., below a first high threshold and above a first low threshold) at 550. For example, the method may involve comparing statistical information (e.g., stored in one of statistics registers 360 in FIG. 3) to corresponding thresholds (e.g., stored in a [sub]set of threshold value registers 312 in FIG. 3). As discussed above, some of the thresholds may be stored as percentage variances or numerical values (see, e.g., U.S. patent application Ser. No. 13/371,313, filed Feb. 10, 2012, the relevant portions of which are incorporated by reference herein). Additionally, at 550, the method determines if the comparison results determined at 520 (e.g., a comparison between stored parametric data and parametric data thresholds) are within an acceptable range. If the comparison results are within an acceptable range (e.g., a monitored parameter value is between high and low warning thresholds), the method proceeds to monitoring one or more parameters related to transceiver operation.

However, if the comparison results are not within an acceptable range (e.g., a monitored parameter value is greater than a high warning threshold, or an average parameter value is less than a low average value threshold), the method generates a corresponding status indication and may send the status indication to a host or external device at 555. The status indications may be represented by indicators such as or corresponding to "OVER LIMIT," "UNDER LIMIT," "WARNING," "ALARM," and high and low variations thereof (e.g., "OVER HIGH LIMIT," "LOW WARNING," "HIGH ALARM," etc.). The status indication may be automatically provided to an external device in the network including the optical transceiver (e.g., via a communication interface such as a DDMI). After the status indication is sent, the method returns to 505, and continues monitoring the parameter(s) related to transceiver operation.

Thus, the present method can advantageously provide an approach for monitoring an optical transceiver in real time, over a predetermined time interval, or over the entire operating life of the optical transceiver. The present method can provide more accurate information regarding trends in optical transceiver operation, predict an impending transceiver failure, and be used to enhance failure analysis by providing details of the optical transceiver just prior to failure.

CONCLUSION/SUMMARY

Embodiments of the present invention can advantageously provide an approach for monitoring an optical transceiver in real time, over a predetermined time interval, or over the entire operating life of the optical transceiver. A current value of a monitored operating parameter and an average operating parameter value (over a predefined time interval) can be stored and compared to predefined thresholds to determine whether components and/or circuitry in the optical transceiver are operating within an acceptable range. That is, the present invention can provide more accurate information regarding trends in optical transceiver operation, predict an impending transceiver failure, and be used as a type of "black box" to enhance failure analysis by providing details of the optical transceiver just prior to failure.

While the above examples include particular implementations of registers and other memory arrangements, as well as comparators and other logic, one skilled in the art will recognize that other designs and arrangements may also be used in accordance with embodiments. For example, other digital logic or elements can be used in certain embodiments. Further, one skilled in the art will recognize that other forms of signaling and/or control (e.g., current-based signaling, flag-based signaling, differential signaling, etc.) may also be used in accordance with various embodiments.

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An optical transceiver, comprising:
    a) a receiver configured to receive optical information, and a transmitter configured to transmit optical information;
    b) circuitry configured to sample data for a plurality of operational parameters of the receiver and transmitter, wherein the plurality of operational parameters comprise at least two members of the group consisting of a temperature, a voltage, a current, an optical power, an output power, a modulation amplitude, a frequency, an amplifier gain, a channel spacing, and a wavelength;
    c) logic configured to perform one or more statistical calculations on a plurality of values of the sampled data to generate statistical information, wherein the statistical information comprises a maximum value, a minimum value, an average value, a rate, and/or one or more standard deviations of at least one of the plurality of operational parameters; and
    d) one or more memories configured to store the sampled data and the statistical information.

2. The optical transceiver of claim 1, further comprising clock circuitry configured to enable periodic sampling of the data.

3. The optical transceiver of claim 2, further comprising a battery configured to provide power to the clock circuitry when the optical transceiver does not receive power.

4. The optical transceiver of claim 2, further comprising a counter coupled to the clock circuitry.

5. The optical transceiver of claim 1, wherein the one or more memories are configured to overwrite at least part of (i) the stored sampled data with current sampled data and/or (ii) the stored statistical information with current statistical information.

6. The optical transceiver of claim 1, wherein the one or more memories are configured to store multiple instances of the sampled data over a predetermined period of time.

7. The optical transceiver of claim 6, wherein the one or more memories are configured to store multiple instances of the statistical information over a predetermined period of time.

8. The optical transceiver of claim 1, wherein the logic is configured to compare the statistical information to one or more thresholds stored in the one or more memories to generate a status indication or flag.

9. The optical transceiver of claim 8, further comprising an interface configured to (i) receive a request from an external device, optical line termination (OLT) system, or host and (ii) provide the sampled data, the statistical information, and/or status indication or flag in response to the request.

10. The optical transceiver of claim 1, wherein the one or more memories comprises a first group of registers storing parametric data, a second group of registers storing thresholds, and a third group of registers storing the statistical information.

11. A method for monitoring one or more parameters in an electronic device, the method comprising:
 a) monitoring a plurality of operating parameters related to operation of the electronic device over time to determine a plurality of parameter values, wherein the plurality of operational parameters comprise at least two members of the group consisting of a temperature, a voltage, a current, an optical power, an output power, a modulation amplitude, a frequency, an amplifier gain, a channel spacing, and a wavelength;
 b) storing the plurality of parameter values in one or more memories;
 c) calculating statistical information on the plurality of parameter values, wherein the statistical information comprises a maximum value, a minimum value, an average value, a rate, and/or one or more standard deviations of the one or more operating parameters;
 d) comparing the statistical information to one or more corresponding thresholds; and
 e) generating a status indication or flag when the statistical information crosses one or more of the corresponding threshold(s).

12. The method of claim 11, further comprising overwriting (i) at least one previously stored parameter value with a most recent or current parameter value and/or (ii) previously stored statistical information with most recent or current statistical information.

13. The method of claim 12, further comprising storing at least one of the plurality of parameter values for a given operating parameter at a plurality of different rates.

14. The method of claim 11, further comprising evaluating a status and/or state of the operating parameter and/or performing a failure analysis using the statistical information.

15. The method of claim 14, comprising evaluating a status indication and/or flag by comparing at least a subset of the statistical information for each of one or more statistical calculations to one or more thresholds corresponding to each of the one or more statistical calculations.

16. The method of claim 15, further comprising storing a result of each comparison of the statistical information to the corresponding threshold(s) in the one or more memories.

17. The method of claim 14, further comprising identifying a failure mechanism from said failure analysis.

18. The method of claim 11, wherein the thresholds comprise at least two of a low threshold, a high threshold, a warning threshold, and an alarm threshold.

19. The method of claim 11, further comprising storing multiple instances of the statistical information in the one or more memories over a predetermined period of time.

* * * * *